United States Patent [19]
Kurosu et al.

[11] Patent Number: 5,516,129
[45] Date of Patent: May 14, 1996

[54] UPPER ARM IN SUSPENSION SYSTEM FOR VEHICLE

[75] Inventors: Norikazu Kurosu; Kiyoshi Nakajima; Satoru Takeishi; Toshiharu Yoshioka, all of Saitama, Japan

[73] Assignee: Honda Giken Kogyo Kabushiki Kaisha, Tokyo, Japan

[21] Appl. No.: 399,139

[22] Filed: Mar. 6, 1995

[30] Foreign Application Priority Data

Mar. 8, 1994 [JP] Japan .................................. 6-037325

[51] Int. Cl.⁶ ...................................................... B60G 3/00
[52] U.S. Cl. ............................................ 280/96.1; 280/666
[58] Field of Search .................................. 280/96.1, 666, 280/667, 670

[56] References Cited

U.S. PATENT DOCUMENTS

| | | | |
|---|---|---|---|
| 3,110,505 | 11/1963 | Gladden | 280/667 |
| 3,195,914 | 7/1965 | Rosky | 280/666 |
| 3,630,303 | 12/1971 | Froumajou | 280/666 |
| 4,761,019 | 8/1988 | Dubensky | 280/96.1 |
| 5,236,209 | 8/1993 | Lopiccolo | 280/96.1 |

FOREIGN PATENT DOCUMENTS 642804  1/1989  Japan .

Primary Examiner—Kenneth R. Rice
Attorney, Agent, or Firm—Weiner, Carrier & Burt; Joseph P. Carrier; Irving M. Weiner

[57] ABSTRACT

An upper arm in a suspension system for a vehicle includes a substantially plate-like body portion which is bifurcated in a longitudinal direction of a vehicle body from a tip end side of the upper arm connected to a knuckle toward a base end side of the upper arm connected to a vehicle body frame, an outer flange extends downwardly from an outer edge of the body portion and then extends outwardly, and an inner flange extends downwardly from an inner edge of the body portion and then extends inwardly. The body portion and the outer and inner flanges are integrally formed from a single material blank through pressing. The vertical dimension of the inner flange closer to load application lines which connect a mounting hole for a ball joint for connecting the upper arm to a knuckle with mounting holes for a pair of rubber bush joints for connecting the upper arm to a vehicle body frame is larger than the vertical dimension of the outer flange farther from the load application lines. Thus, it is possible to increase the rigidity of the upper arm and reduce the weight thereof in comparison to known upper arms with similar bifurcated structures.

6 Claims, 6 Drawing Sheets

UPPER ARM IN SUSPENSION SYSTEM FOR VEHICLE

BACKGROUND OF THE INVENTION

1. Field of the Invention

The present invention relates to an upper arm made by pressing and used in a suspension system for a vehicle.

2. Description of Relevant Art

A so-called A-shaped upper suspension arm is conventionally known. The conventional arm is integrally formed by pressing a metal blank into a substantially U-shape or V-shape as viewed in a plane, and has bifurcated base ends pivotally supportable at respective front and rear points on a vehicle body frame and a tip end pivotally supportable at a single point on a knuckle (see Japanese Utility Model Publication No. 2804/89).

FIGS. 7 to 10 illustrate such known upper arm made by pressing. FIG. 7 is a plan view of the upper arm. FIG. 8 is a side elevational view taken in a direction of arrow 8 in FIG. 7. FIG. 9 is a sectional view taken along a line 9—9 in FIG. 7. FIG. 10 is a sectional view taken along a line 10—10 in FIG. 7.

The upper arm UA includes a body 1 made of a substantially U-shaped plate as viewed in a plane. A mounting hole $1_1$ for ball joint $J_1$ for connecting the upper arm to a knuckle is provided by a downward burring in the body 1 at a location adjacent the tip end of the upper arm UA. An inner flange 2 extending downwardly and then extending inwardly is integrally formed by pressing at an inner edge of the body 1, i.e., at an edge surrounding a damper D and a suspension spring S which are disposed coaxially with each other, and an outer flange 3 extending downwardly and then extending outwardly is integrally formed by pressing at an outer edge of the body 1, i.e., at an edge remote from the damper D and the suspension spring S. Mounting holes $3_1$, $3_1$ for a pair of rubber bush joints $J_2$, $J_2$ for pivotally supporting the upper arm UA on the vehicle body frame are provided by an inward burring in the outer flange 3 at locations adjacent the base end of the upper arm UA.

As can be seen from FIG. 10, in the above-described upper arm UA made by pressing, the vertical dimension Ho of the outer flange 3 extending downwardly from an outer periphery of the body 1 and having the mounting holes $3_1$, $3_1$ is larger than the vertical dimension Hi of the inner flange 2 extending downwardly from an inner periphery of the body 1. As a result, as can be seen from FIG. 7, the centroid of a section of the upper arm UA is defined at a location closer to the outer flange than to the inner flange, and largely spaced apart at a central portion of the upper arm UA by a distance d∝ from lines L, L (straight lines connecting the mounting hole $1_1$ and the mounting holes $3_1$, $3_1$) of application of a load transferred from the knuckle through the upper arm UA to the vehicle body frame.

Therefore, this known upper arm is disadvantageous in that an offset between the centroid and the load application lines L, L becomes large, resulting in a larger moment and hence, the outer flange 3 having the larger vertical dimension Ho and a high strength cannot effectively contribute to an increase in rigidity of the upper arm UA. If a sufficiently high rigidity of the upper arm UA is to be insured with the known upper arm, the plate thickness and corresponding weight of the body 1 must be increased.

SUMMARY OF THE INVENTION

Accordingly, it is an object of the present invention to increase the rigidity of the upper arm without bringing about an increase in weight.

To achieve the above object, according to a first aspect and feature of the present invention, there is provided an upper arm in a suspension system for a vehicle having a vehicle body and a vehicle body frame, comprising: a substantially plate-like body portion which is bifurcated in a longitudinal direction of a vehicle body from a tip end side of the upper arm connected to a knuckle toward a base end side of the upper arm connected to the vehicle body frame; an outer flange extending downwardly from an outer edge of the body portion and then extending outwardly; and an inner flange extending downwardly from an inner edge of the body portion and then extending inwardly, the body portion and the outer and inner flanges being integrally formed by pressing, wherein a vertical dimension of the inner flange is larger than a vertical dimension of the outer flange, and the inner flange is provided, at the base end side of the upper arm, with a pair of mounting holes for a pair of front and rear joints for connecting the inner flange to the vehicle frame.

With the first aspect and feature of the present invention, the centroid of a section of the inner flange can be set at a location closer to load application lines in the upper arm, thereby increasing the rigidity of the upper arm. Moreover, in forming the upper arm by pressing, the inner flange having the larger vertical dimension can be formed from a material located adjacent the inner periphery of the upper arm and hence, it is possible to suppress wastefulness of material to the minimum to reduce the cost of manufacturing the arm.

In addition to the first feature, according to a second aspect and feature of the present invention, the mounting holes for the joints are formed in the inner flange by an inward burring so that the inner flange has an inwardly extending lip defining the mounting holes.

With the above second feature of the present invention, the distance between the front and rear joints can be decreased and therefore, the mounting portion of the upper arm to the vehicle body frame can be made compact.

The above and other objects, features and advantages of the invention will become apparent from the following description of a preferred embodiment taken in conjunction with the accompanying drawings.

DESCRIPTION OF THE PREFERRED EMBODIMENT

The present invention will now be described by way of a preferred embodiment in connection with the accompanying drawings.

Figure 1:
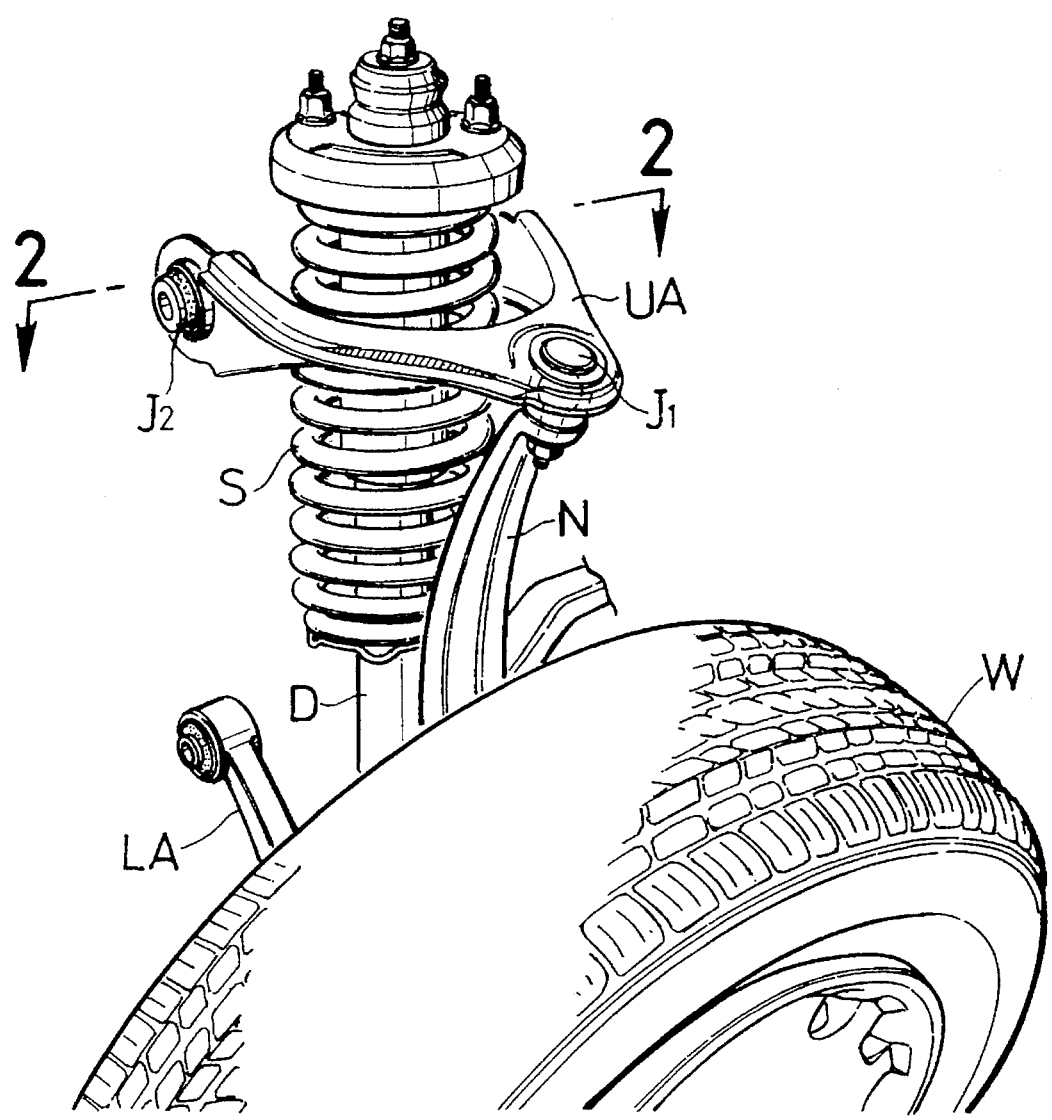
FIG. 1 is a perspective view of a suspension system for a vehicle including an upper arm according to a preferred embodiment of the invention.

Referring to FIG. 1, a suspension system for a vehicle includes a knuckle N for rotatably supporting a wheel W, a lower arm LA for supporting the knuckle N on a vehicle body frame for vertical movement, an upper arm UA for supporting the knuckle N on the vehicle body frame for vertical movement, a damper D passing through an inside space of the upper arm UA to connect the vehicle body frame and the lower arm LA to each other, and a suspension spring S supported around an outer periphery of the damper D.

As shown in FIGS. 2 to 5, the upper arm UA made by pressing is integrally provided with a body portion 1 made of a plate having a substantially U-shape as viewed in a plane, an inner flange 2 extending downwardly from an inner edge of the body portion 1 and then extending inwardly, and an outer flange 3 extending downwardly from an outer edge of the body portion 1 and then extending outwardly. A mounting hole $1_1$ for a ball joint $J_1$ for connecting the upper arm UA to the knuckle is provided in the body portion 1 at a location adjacent a tip end of the upper arm UA by a downward burring, and mounting holes $2_1$, $2_1$ for a pair of front and rear rubber bush joints $J_2$, $J_2$ for connecting the upper arm UA to the vehicle body frame are provided in the inner flange 2 at locations adjacent a base end of the upper arm UA by an inward burring so that the inner flange 2 has inwardly extending lips defining the mounting holes $2_1$, $2_1$.

In this case, in order to insure a supporting rigidity, the centers of the rubber bush joints $J_2$, $J_2$ are located on the burring, but by forming the inward burring on the inner flange 2, the positions of the rubber bush joints $J_2$, $J_2$ are closer to the damper D, as compared with the known upper arm shown in FIGS. 7–10. Therefore, the portion of the upper arm UA for being mounted to a vehicle body can be made compact.

Figure 2:
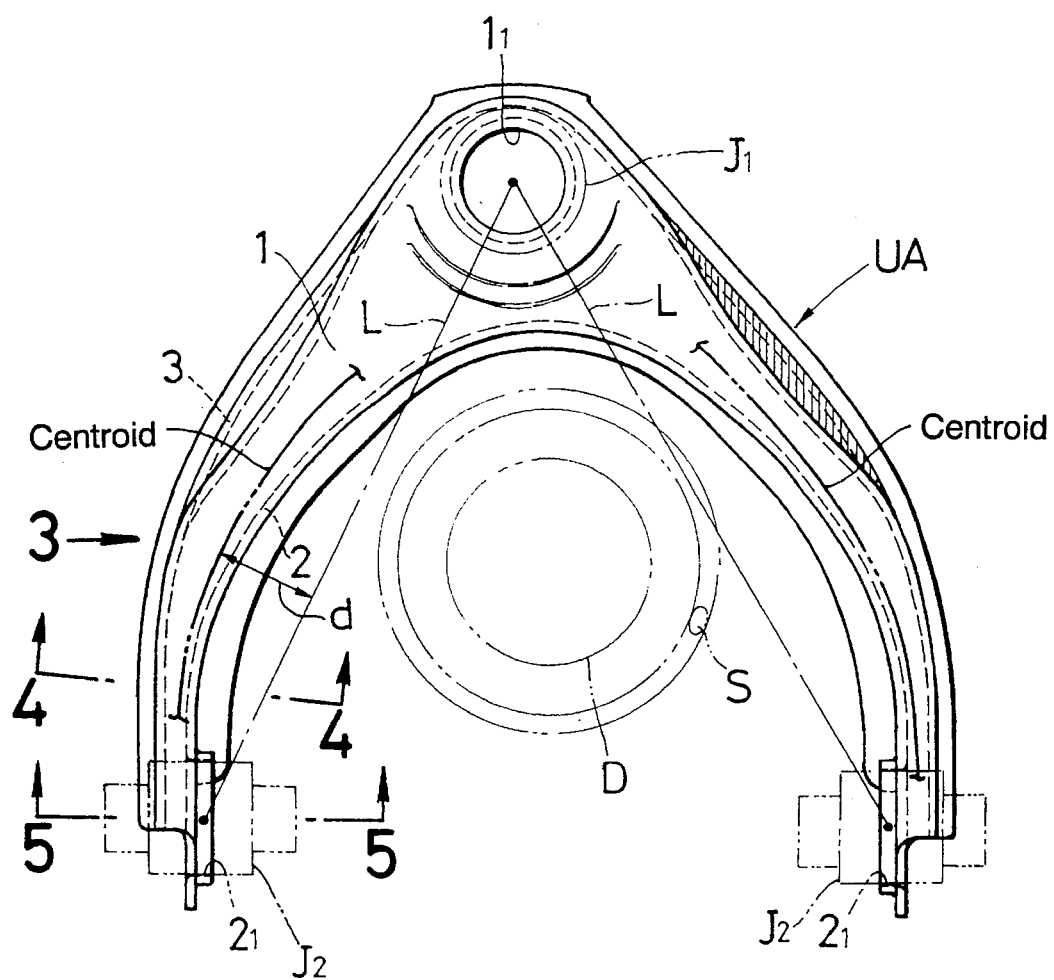
FIG. 2 is an enlarged side elevational view taken along a line 2—2 in FIG. 1 with the spring, damper and bush joints shown in broken lines.
Figure 3:
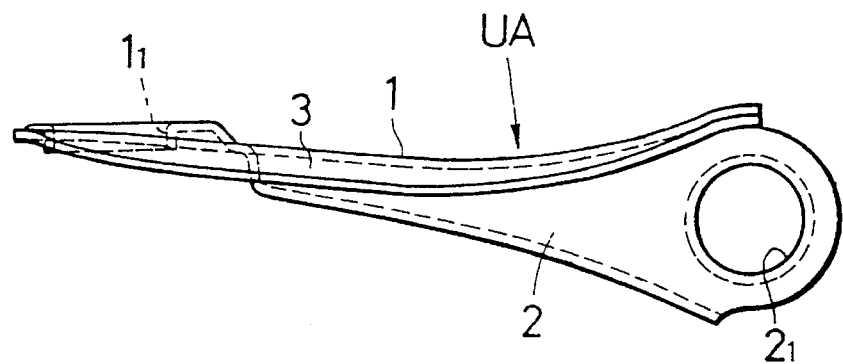
FIG. 3 is a view taken in a direction of arrow 3 in FIG. 2.
Figure 4:
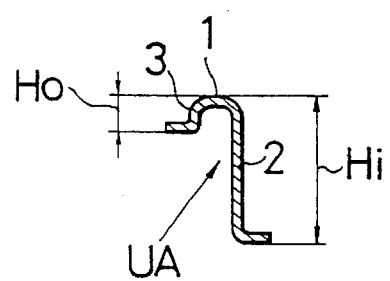
FIG. 4 is a sectional view taken along a line 4—4 in FIG. 2.
Figure 5:
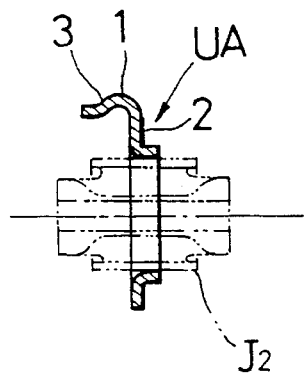
FIG. 5 is a view taken along a line 5—5 in FIG. 2.

The inner flange 2 extends downwardly from the inner periphery of the body portion 1 and includes the mounting holes $2_1$, $2_1$ for the rubber bush joints $J_2$, $J_2$. As can be seen from FIG. 5, the vertical dimension Hi of the inner flange 2 is set larger than the vertical dimension Ho of the outer flange 3 extending downwardly from the outer periphery of the body portion 1. As shown in FIG. 2, the centroid of a section of the upper arm UA is defined at a location closer to the inner flange 2 having the larger vertical dimension Hi and a higher strength, and the distance d between load application lines L, L and the centroid can be reduced in comparison to the known upper arm even around a central portion of the upper arm UA.

As described above, the vertical dimension Hi of the inner flange 2 of the upper arm UA closer to the load application lines L, L is set large and the vertical dimension Ho of the outer flange 3 of the upper arm UA farther from the load application lines L, L is set small. Therefore, the centroid of the section of the upper arm UA becomes closer to the inner flange 2 in comparison to the known upper arm. As a result, an offset between the centroid and the load application lines L, L becomes smaller. Thus, it is possible to effectively receive a load applied to the upper arm UA and to increase the rigidity of the upper arm UA without an increase in plate thickness of the arm.

Figure 6A:
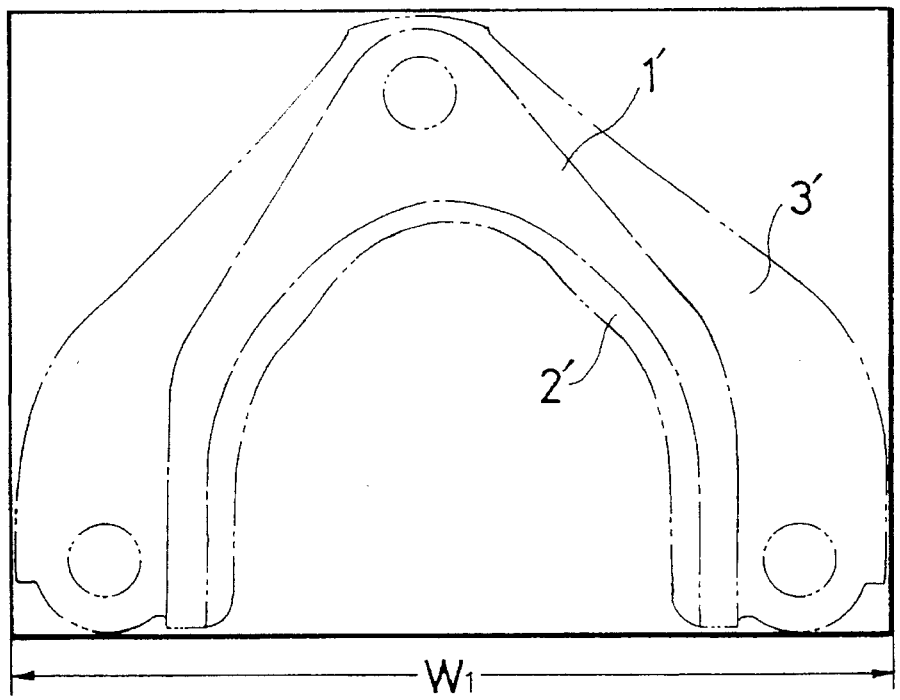
FIGS. 6A and 6B are diagrams for explaining the operation of the upper arm.
Figure 6B:
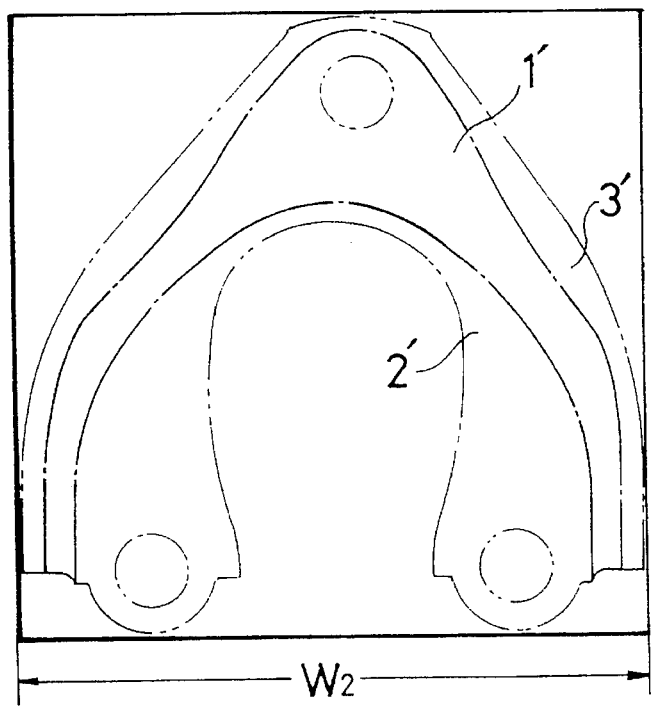
Figure 7:
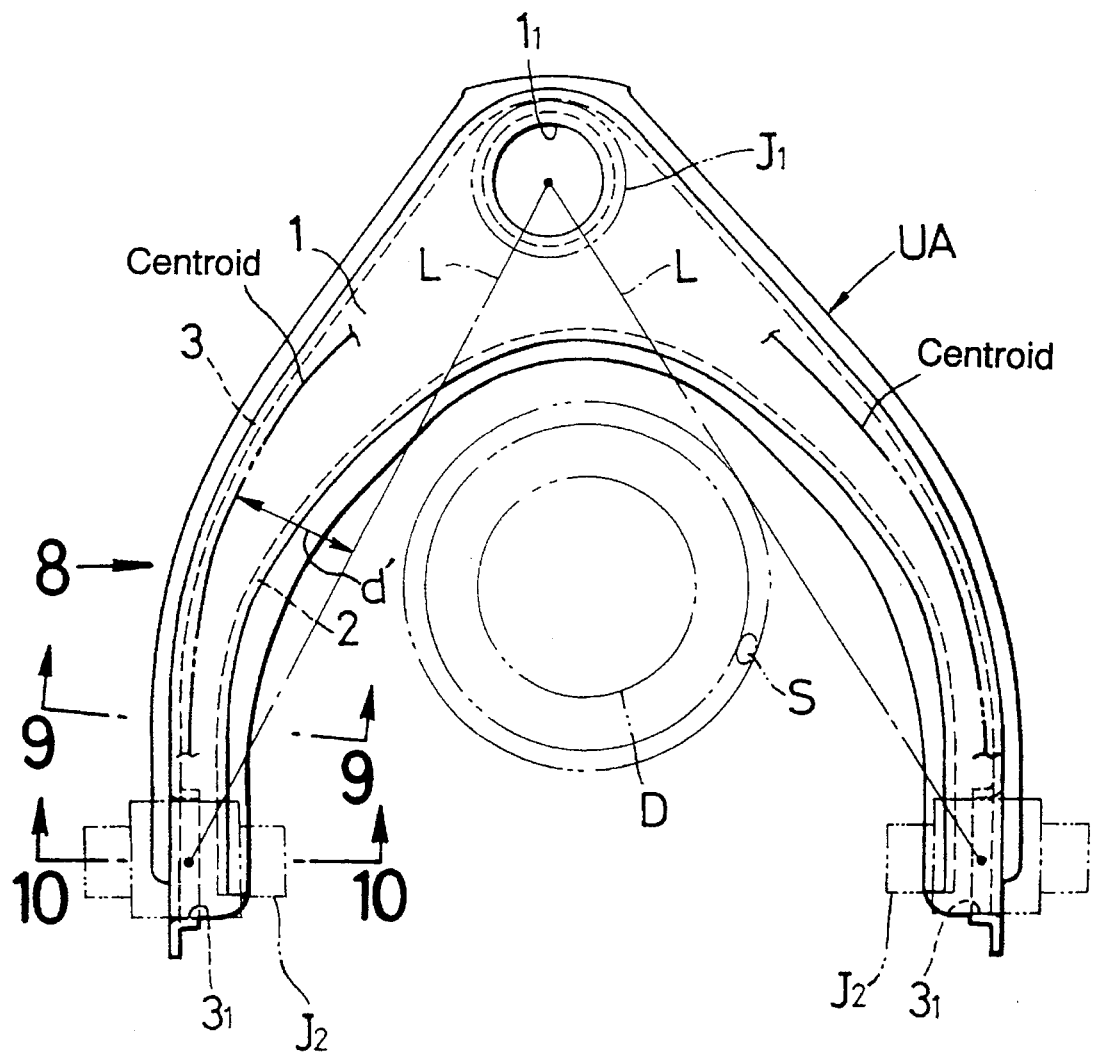
FIG. 7 is a plan view of a known upper arm as discussed above, similar to the upper arm of FIG. 2.
Figure 8:
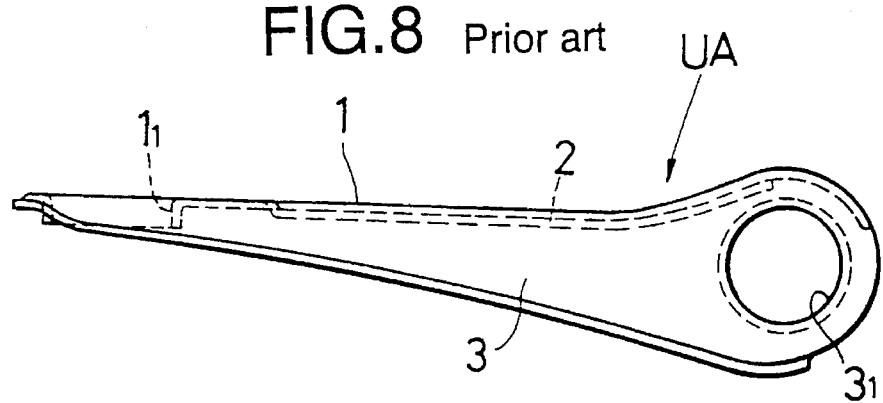
FIG. 8 is a side elevational view taken in a direction of arrow 8 in FIG. 7.
Figure 9:
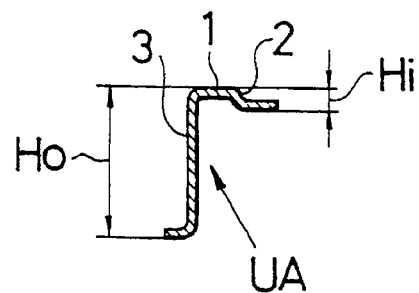
FIG. 9 is a sectional view taken along a line 9—9 in FIG. 7.
Figure 10:
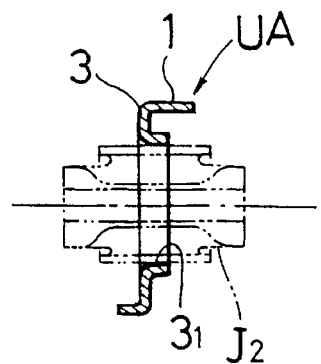
FIG. 10 is a sectional view taken along a line $10_10$ in FIG. 7.

FIG. 6A illustrates a size of a material blank required for press-forming a conventional upper arm UA in which a vertical dimension Ho of an outer flange 3 is large, such as the known upper arm of FIGS. 7–10. FIG. 6B illustrates a size of a material blank required for press-forming the upper arm UA of the present invention in which a vertical dimension Hi of the inner flange 2 is large. In FIGS. 6A and 6B, reference character 1' is a body portion corresponding to the body portion 1 after formation; reference character 2' is an inner flange corresponding to the inner flange 2 after formation, and reference character 3' is an outer flange corresponding to the outer flange 3 after formation.

As can be seen from FIGS. 6A and 6B, in the known upper arm UA shown in FIG. 6A the outer flange 3' with the larger vertical dimension Ho and with the mounting holes $3_1$ formed therein is made using a material located adjacent the inner periphery of the U-shaped body portion 1', whereas in the upper arm UA of the present invention shown in FIG. 6B the inner flange 2' with the larger vertical dimension Hi and with the mounting holes $2_1$ formed therein is made using a material located adjacent an inner periphery of the U-shaped body portion 1'. Therefore, in the known upper arm, a required width $W_1$ of the material blank is much larger than a required width $W_2$ of the material blank according to the invention, leading to a reduction in cost.

Although the preferred embodiment of the present invention has been described in detail, it will be understood that the present invention is not limited to the above-described embodiment, and various modifications in design may be made without departing from the spirit and scope of the invention defined in the claims.

What is claimed is:

1. An upper arm in a suspension system for a vehicle, comprising:

a substantially plate-like body portion which is bifurcated in a longitudinal direction of a vehicle body from a tip end side of the upper arm connected to a knuckle toward a base end side of the upper arm connected to a vehicle body frame;

an outer flange extending downwardly from an outer edge of the body portion and then extending outwardly; and an inner flange extending downwardly from an inner edge of the body portion and then extending inwardly, said body portion and said outer and inner flanges being integrally formed by pressing, wherein a vertical dimension of said inner flange is larger than a vertical dimension of said outer flange, and said inner flange is provided, at the base end side of said upper arm, with a pair of mounting holes for a pair of front and rear joints for connecting said inner flange to said vehicle frame.

2. An upper arm in a suspension system for a vehicle according to claim 1, wherein said mounting holes for the joints are formed in said inner flange by an inward burring so that the inner flange has inwardly extending lips defining said mounting holes.

3. An upper arm according to claim 1, wherein a portion of said inner flange provided with said mounting holes extends inwardly from said body portion relative to the vehicle body.

4. An upper arm according to claim 1, wherein a centroid of a section of the upper arm between the tip end side and the base end side is located closer to said inner flange than to said outer flange.

5. An upper arm of a wheel suspension for being pivotally connected between a knuckle and a vehicle frame, the upper arm comprising:

a substantially U-shaped body portion with a pair of spaced arms;

an outer flange extending downwardly and then inwardly from an outer peripheral edge of said body portion;

an inner flange extending downwardly and then inwardly from an inner peripheral edge of said body portion;

said inner flange having a pair of mounting holes defined therein near respective free ends of said spaced arms for connecting said inner flange to a vehicle frame; and said body portion and said inner and outer flanges being integrally formed as a unitary member from a material blank.

6. An upper arm according to claim 5, wherein a vertical height of said inner flange is larger than a vertical height of said outer flange.

* * * * *